United States Patent [19]

Seo

[11] Patent Number: 5,764,281
[45] Date of Patent: Jun. 9, 1998

[54] PASSWORD RESTRICTION OF CABLE TELEVISION CHANNEL USING KEY INPUT CONTROLLER

[75] Inventor: Ho Il Seo, Kyoungki-do, Rep. of Korea

[73] Assignee: Hyundai Electronics Industries, Co., Kyoungki-do

[21] Appl. No.: 404,600

[22] Filed: Mar. 15, 1995

[30] Foreign Application Priority Data

Mar. 16, 1994 [KR] Rep. of Korea ............... 94-5229

[51] Int. Cl.$^6$ ............... H04N 5/44
[52] U.S. Cl. ............... 348/5.5; 348/10; 348/553; 455/6.2
[58] Field of Search ............... 348/6, 734, 10, 348/7, 5.5, 12, 13, 906, 8, 9, 553, 563, 569, 570; 455/3.2, 26.1, 3.1, 4.1, 4.2, 5.1, 6.1, 6.2; H04N 5/44, 7/10

[56] References Cited

U.S. PATENT DOCUMENTS

| | | | |
|---|---|---|---|
| 5,016,272 | 5/1991 | Stubbs et al. | 348/6 X |
| 5,027,400 | 6/1991 | Baji et al. | 348/10 |
| 5,068,734 | 11/1991 | Beery | 348/734 X |

*Primary Examiner*—John K. Peng
*Assistant Examiner*—Nathan J. Flynn
*Attorney, Agent, or Firm*—Watson Cole Stevens Davis, PLLC

[57] ABSTRACT

A password (PW) restriction apparatus for cable television (CT) channels having a downward receiving signal controller (DRSC) for receiving a downward receiving signal output from a cable television transmitting/receiving portion (CTTRP) and transmitting digital signals to control the generation of video and audio (V and A) signals; a television/audio decoder (TAD) for decoding the digital signals to generate V and A; a central processing unit (CPU) for processing (PW) for enabling a user to at least select one of changing a password channel (PWC) and processing a new PW from the CTTRP; an upward transmitting signal controller for multiplexing a user-controlled signal and maintenance signal output from the CPU and transmitting the multiplexed signals to the CTTRP; an on-screen display controller for generating a user-controlled screen (UCS) on a user television screen and transmitting the generated USC to the TAD; a user-operated key pad for generating password channel selection (PWCS) and password channel restriction (PWCR) data as switching signal inputs; a key pad controller for inputting the switching signal inputs to the CPU and processing a scanning signal from the CPU; a remote controller receiver for receiving an infrared signal (IS) from a remote controller and transmitting the IS to the CPU, and the IS including signals for generating PCS and PCR data a memory storing system parameters.

4 Claims, 11 Drawing Sheets

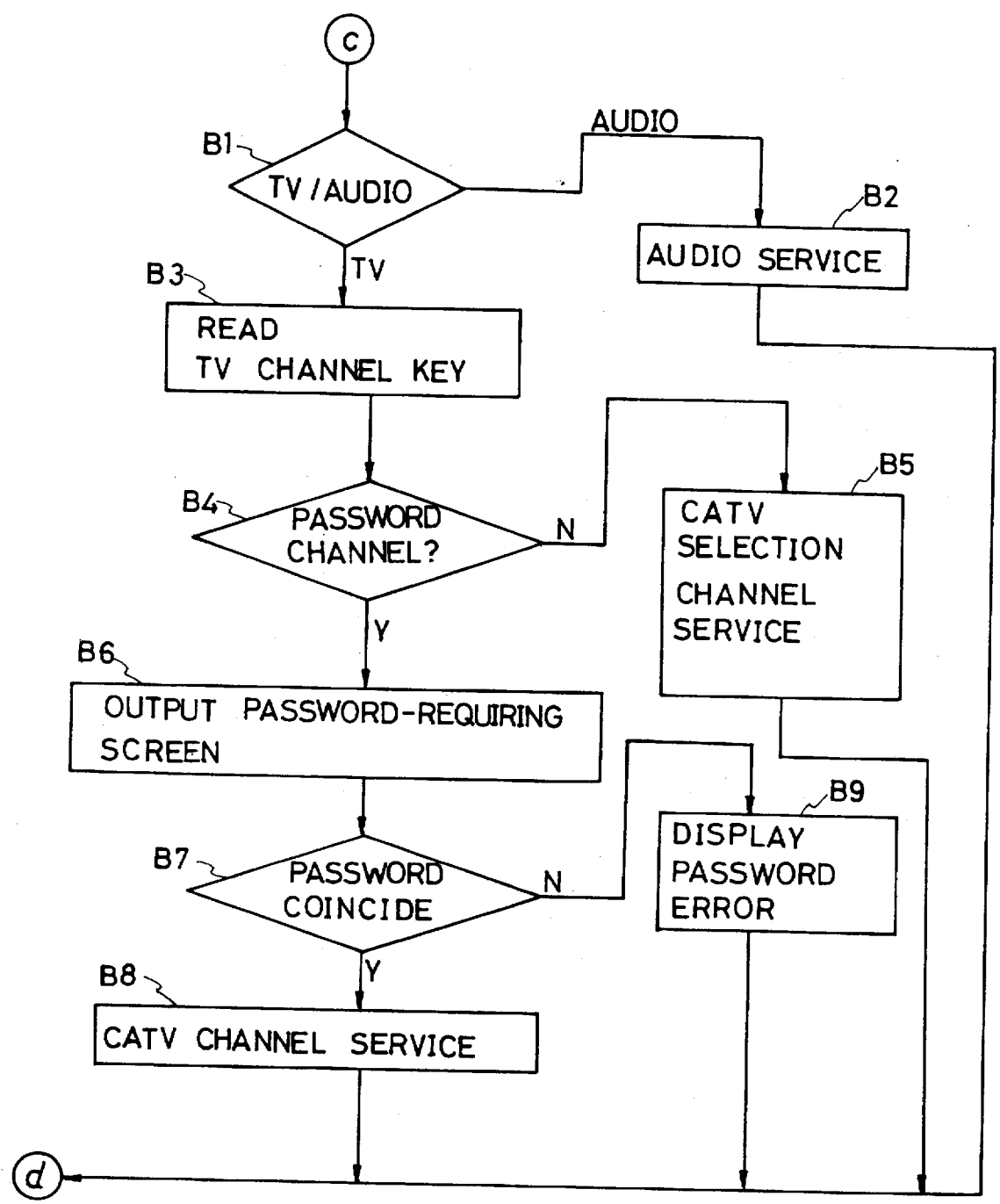

PASSWORD RESTRICTION OF CABLE TELEVISION CHANNEL USING KEY INPUT CONTROLLER

BACKGROUND OF THE INVENTION

The present invention relates to a key input controller for a cable television and method therefor, and more particularly, to a key input controller for a cable television and method therefor in which a key pad or remote controller is used to enable a user interface, especially, the control of a password, in a household cable television.

Generally, a cable television is advantageous in employing multiple channels. However, there is no method of controlling a key for multiple channels at present (although provided, it is very inconvenient to manipulate due to complicated configuration). It is therefore inconvenient for a user to input a password for a specific channel to allow only a person who inputs the password to view the channel, or to change a channel stored.

SUMMARY OF INVENTION

In order to overcome such drawbacks, it is an object of the present invention to provide a key input controller for a cable television and method therefor in which, if a user wants to input or change the password for a channel, a key pad attached to the main body of a television, or a remote controller is used to control the password through a simple operation of the key.

To accomplish the object of the present invention, there is provided a key input controller for a cable television comprising: a cable television transmitting/receiving portion for transmitting or receiving a cable television transmitting signal; a downward receiving signal controller for receiving a downward receiving signal output from the cable television transmitting/receiving portion; a television/audio decoder for decoding a signal output from the downward receiving signal controller, to generate video and audio signals; a central processing unit; a upward transmitting signal controller for multiplexing a user-controlled signal and maintenance signal output from the central processing unit, and transmitting the multiplexed signals to the cable television transmitting/receiving portion; a screen controller for generating a user-controlled screen on a television screen that a user views, and transmitting the generated screen; a key pad controller for controlling a switching signal input from a key pad to be converted into what the central processing unit requires and be transmitted to the central processing unit, and receiving and processing a scanning signal of the central processing unit; a remote controller receiver for receiving an infrared signal from a remote controller, and transmitting the signal to the central processing unit; a memory for storing system parameters required in operation of the central processing unit; a battery back-up portion for use in protecting the contents of the memory; and a key pad for allowing a user to input information with keys, whereby the keys input via the key pad or remote controller are controlled using a password.

There is provided a key input controlling method for a cable television comprising the steps of: (A1) inquiring whether, in power on, a channel is a password channel or not; (A2) outputting a password-requiring screen, if the condition of step (A1) is satisfied; (A3) viewing a normal screen to a user, and going to step (A7), if the condition of step (A1) is not satisfied; (A4) receiving a password from the user, and asking whether this password coincides with a password registered in a subscriber's in-house apparatus; (A5) displaying a password error, and selecting a free service television channel out of available cable television channels, for service to the user, if the condition of step (A4) is not satisfied; (A6) providing cable television service for a corresponding channel, if the condition of step (A4) is satisfied; (A7) providing cable television service, changing into a mode for waiting for key input, asking whether there is present key input or not, and if there is no key input, waiting until there is key input; (AS) asking whether a key input is for password key or general service, if there is the key input in step (A7), and if the key is for general service, jumping to a corresponding step; (A9) outputting a corresponding password-channel-registered screen, if the condition of step (AS) is satisfied; (A10) asking whether the output screen is a password change mode or not; (A11) selecting a password-change channel, and requiring the old password, if the condition of step (A10) is satisfied; (A12) detecting whether the currently input password and the old password are identical; (A13) changing the password, if the condition of step (A12) is satisfied; (A14) outputting a password error message, if the password is not changed or an error is created in step (A12); (A15) asking whether the password is continued to change or not, if the password is to be changed, repeating step (A11), and if the change of password is to stop, performing step (A7); (A16) asking whether a recognition message for erasing the password is output or not, if not a change mode in step (A10); (A17) outputting a password-erase-requiring-message screen to a cable television signal transmitter, and jumping to step (A7), if the condition of step (A16) is not satisfied; (A18) selecting a new password input channel, and registering a new password, if the condition of step (A16) is satisfied; and (A19) asking whether a new password is continued to be input or not, if continued, repeating step (A18), and if to stop, performing step (A7).

DETAILED DESCRIPTION OF INVENTION

FIGS. 4A, 4B and 4C are a flowchart of changing or inputting a password;

DETAILED DESCRIPTION OF THE INVENTION

Hereinafter, a preferred embodiment of the present invention will be described with reference to the attached drawings.

Figure 1:
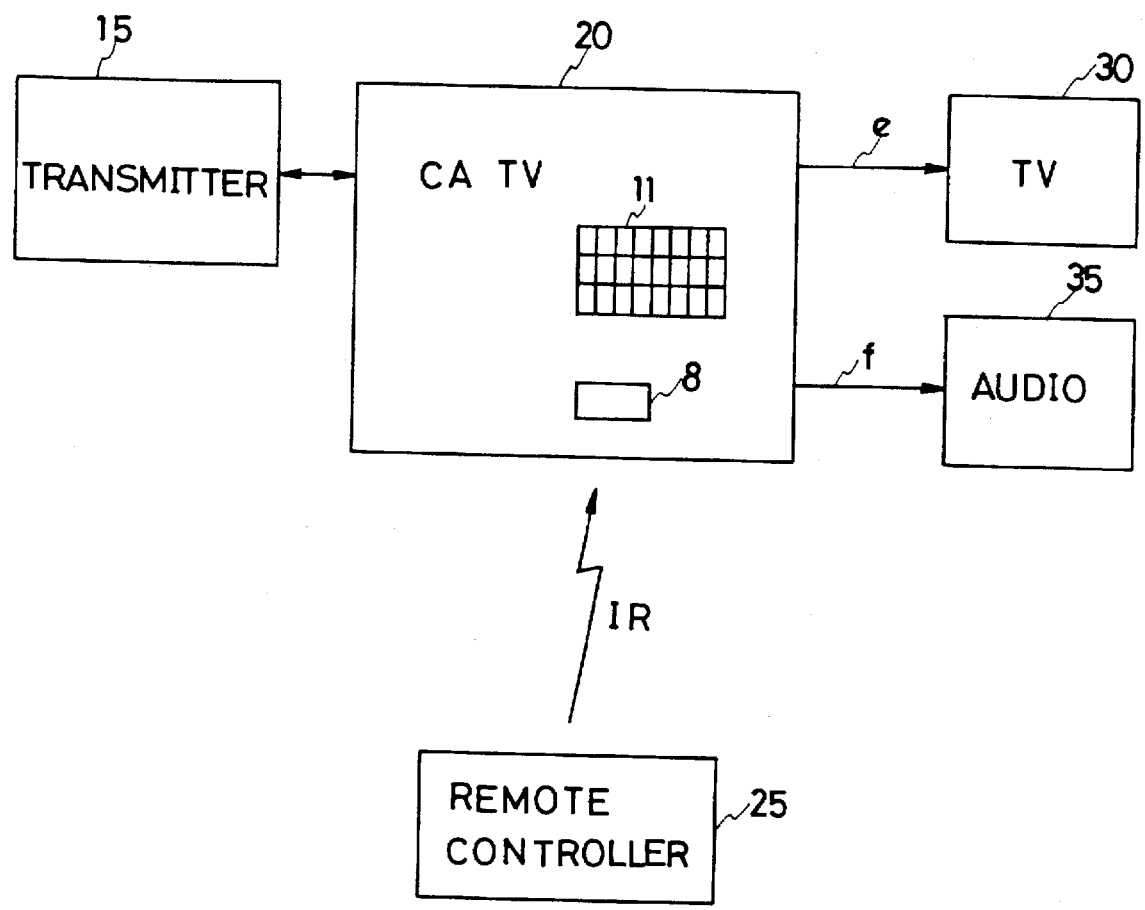
FIG. 1 is a system configuration of a cable television.

Referring to FIG. 1, a cable television subscriber apparatus is to receive a light or high-frequency (RF) signal from a cable television signal transmitter, and to thereby output television video and audio signals. The apparatus receives a control signal of an external key pad and a remote controller signal so as to control a television channel. A signal input from a cable television signal transmitter 15 is received by household cable television apparatus 20, and then output as television image signal e and audio signal f. Here, signals e and f are those converted into user-required information by remote controller 25. Television image signal e is output through television 30, audio signal f through audio apparatus 35. Said central processing unit 5 controls the downward receiving controller 2 and receives control signals such as PSW_DEL for deleting prior passwords at a port I.

Figure 2:
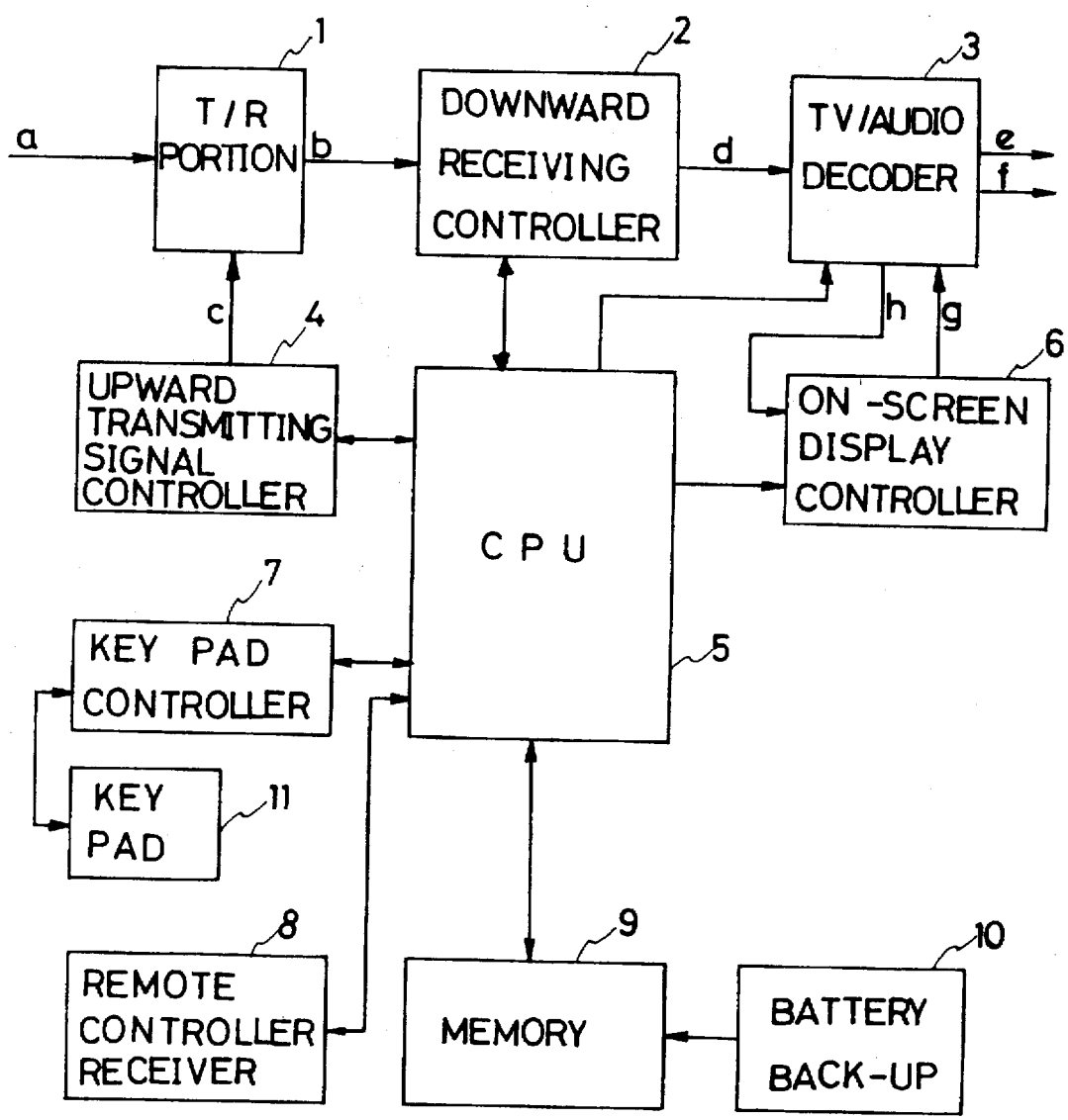
FIG. 2 is an internal configuration of the cable television.

Referring to FIG. 2, the cable television comprises a cable television transmitting/receiving portion 1 for receiving cable television transmitting signal a, transmitting a downward receiving signal multiplexed from television video and audio signals, or, if necessary, a complex information communication network signal, to downward receiving controller 2, when a user-controlled signal is input from upward transmitting signal controller 4, converting the signal into a light or high-frequency signal, and transmitting the converted signal to cable television signal transmitter 15; a downward receiving signal controller 2 for transmitting a digital signal d generated by reversely multiplexing downward receiving signal b multiplexed and input from cable television transmitting/receiving portion 1, to television/ audio decoder 3, generating a sync clock from the multiplexed downward receiving signal b, to be used in an internal phase-locked loop (PLL), and supplying the clock to an internal multiplexer; and a television/audio decoder 3 for decoding television video and audio signals compressed from digital signal d input from downward receiving controller 2, and generating the signals as NTSC composite video and audio signals e and f.

The cable television of the present invention further comprises a upward transmitting signal controller 4 for multiplexing the user-controlled signal and maintenance signal input from central processing unit 5, and transmitting the multiplexed signals to cable television transmitting/ receiving portion 1; a central processing unit 5 for controlling downward receiving controller 2, television/audio decoder 3, upward transmitting controller 4, on-screen display controller 6, key pad controller 7, and a remote controller receiver 8; an on-screen display controller 6 for generating and transmitting a user-controlled screen on a television screen that a user views; a key pad controller 7 for controlling a switching signal input from key pad 11 to be converted into what central processing unit 5 requires, transmitting the converted signal to central processing unit 5, and receiving and processing a scanning signal of central processing unit 5; a remote controller receiver 8 for receiving an infrared signal from remote controller 25, and transmitting the signal to central processing unit 5; a memory 9 for storing system parameters necessary in operation of central processing unit 5; a battery back-up portion 10 for use in protecting the contents stored in the memory even when an external power is turned off; and a key pad 11 for allowing a user to input information with keys.

In upward transmitting controller 4, for the user-controlled signal, there is a channel selection signal. Generally speaking, upward transmitting signal c is lower than downward receiving signal b in transmission speed.

Central processing unit 5 controls downward receiving signal controller 2 to receive downward receiving signal b, so that digital signal d, the output signal of downward receiving controller 2, is reversely multiplexed. The central processing unit controls that the reversely multiplexed signal is received so that television video and audio signals e and f begin to be decoded in an intended time slot.

Further, if the user-selected signal is input from key pad 11, or remote controller receiver 8, the central processing unit interprets and processes the input signal. In addition, the central processing unit transmits data for user-selected channel, or the user-controlled signal for maintenance to upward transmitting signal controller 4.

On-screen display controller 6 receives a detected sync signal h, and converts the video data input from central processing unit 5 into red, green, and blue signals, to thereby generate an image signal g.

In the configuration of the cable television, briefly speaking, an infrared signal is received from remote controller receiver 8, and key information is transmitted to central processing unit 5. Central processing unit 5 interprets the key information, and transmits a corresponding screen to the television screen via on-screen display controller 6. Key information input via key pad 11 is also processed in the same way as that from remote controller 25.

Figure 3:
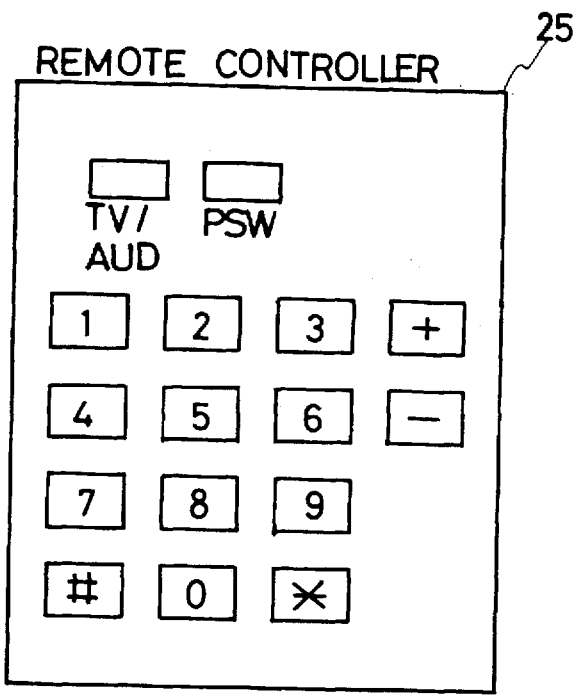
FIG. 3 is an exterior view of a remote controller pad.

Referring to FIG. 3, it is desirable that a remote controller key pad basically comprises a television/audio key, password key, and television channel key.

Figure 4A:
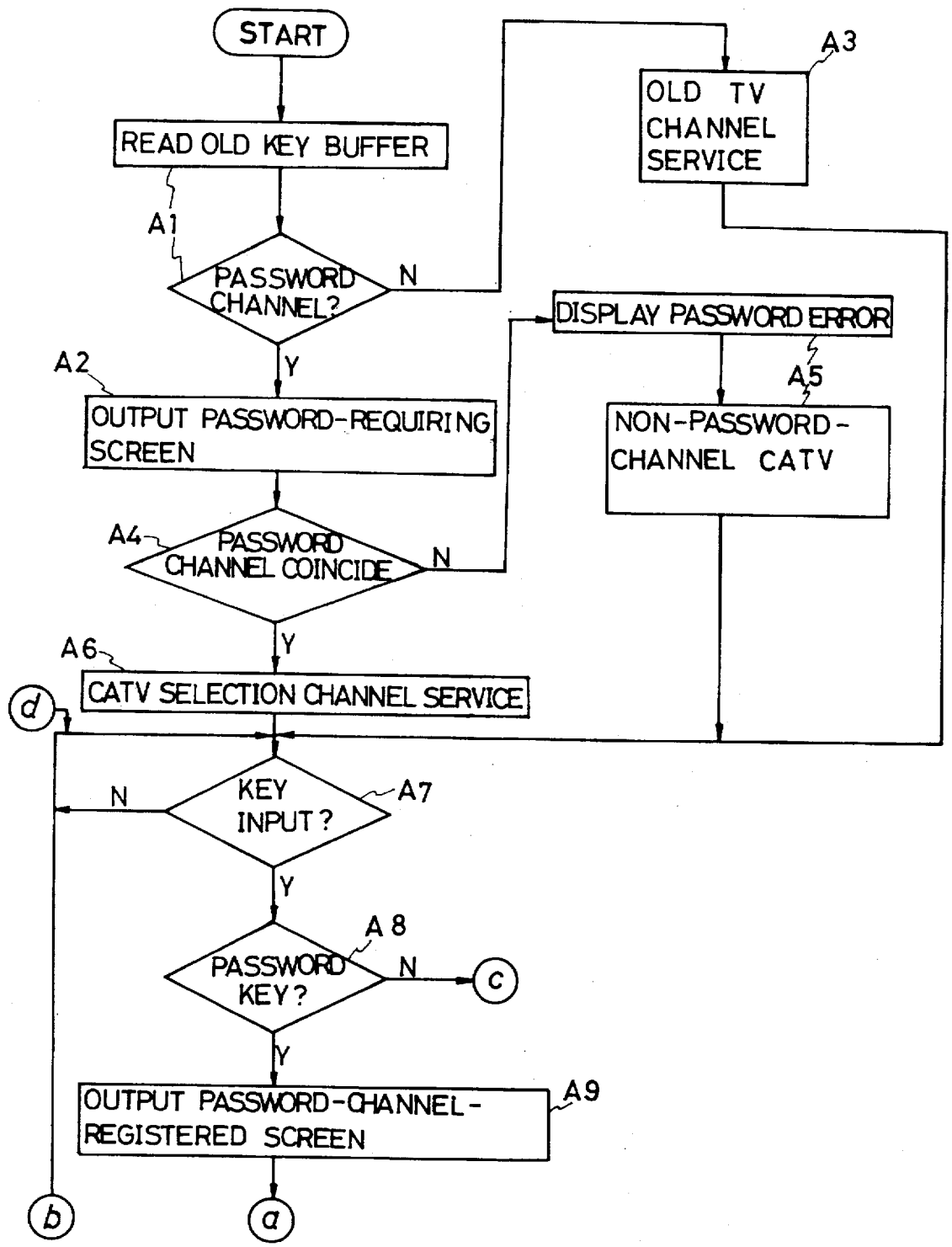
Figure 4B:
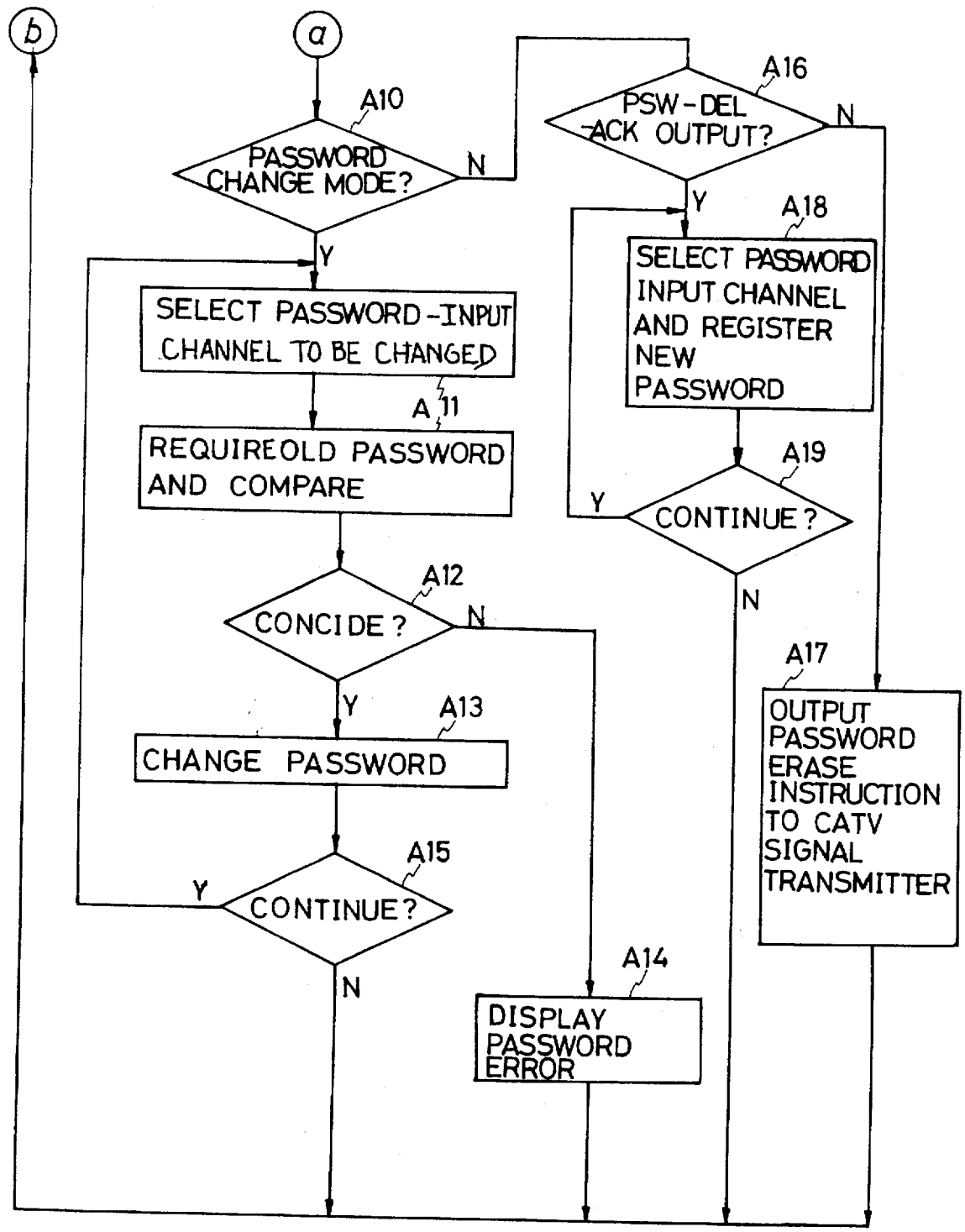

Turning to FIGS. 4A, 4B and 4C, a flowchart of changing a password and inputting a new one comprises the following steps. In step A1, when power is turned on by a user, central processing unit 5 reads a channel number stored in the memory and provided before a user turned off the power, from an old key buffer, and inquires whether the channel is a password channel or not. In step A2, if this condition is satisfied, a password-requiring screen is output. If not satisfied, this means a password protect-free channel. In this situation, a normal screen is viewed to the user, and the step goes to step A7.

In step A4, a password is received from the user, and it is asked whether this password coincides with the password registered in the subscriber's in-house apparatus. If this condition is not satisfied, in step A5, a password error is displayed, and a free service television channel is selected, out of available cable television channels, for service to the user. In step A6, if the condition of step A4 is satisfied, cable television service for a corresponding channel is provided.

In step A7, when the cable television service begins, the central processing unit is changed into a mode for waiting for key input from key pad 11 by the user. It is asked whether there is present the key input or not. If there is no key input, the mode waits until there is a key input. In step A8, if there is a key input in step A7, it is asked whether the key input is for password key or general service. If the key is for general service, the step jumps to a corresponding step.

When step A8 is satisfied, a corresponding password-channel-registered screen is output in step A9. In step A10, it is asked whether the output screen is a password change mode or not. If step A10 is satisfied, in step A11, a password-change channel is selected, and the old password is required.

In step A12, it is compared that the currently input password and -the old password are identical. In step A13, if step A12 is satisfied, the password is changed. If the password is not changed or an error is created in step A12, in step A14, a password error message is output. In step A15, it is asked whether the password is continued to change or not. If the password is to be changed, step A11 repeats. If the change of password is to stop, step A7 is performed.

If not a change mode in step A10, this means a case to input a new password. Therefore, in step A16, it is asked whether a recognition message PSW_DEL_ACK for erasing the password is output or not. In step A17, if step A16 is not satisfied, a password-erase-requiring-message screen (shown in FIG. 6I) is output to cable television signal transmitter 15, and then the step jumps to step A7.

In step A18, if step A16 is satisfied, a new password input channel is selected, and a new password is registered. In step A19, it is asked whether a new password is continued to be input or not. If continued, step A18 repeats. If the input of password is to stop, step A7 is performed.

In order for general service, step A8 comprises the following substeps. First, in step B1, it is asked whether the input key is for switching of television and audio. In step B2, if the mode is audio in step B1, service for audio is given, and the step goes back to step A7. In step B3, if the mode is television in step B1, a television channel key is read. In step B4, it is asked whether the input key is a password channel or not. In step B5, if not in step B4, cable television service for a user-selected channel is given, and the step goes to step A7. In step B6, if the input key is a password channel in step B4, a password-requiring screen is output. In step B7, it is detected whether the user-input password is identical to the already-registered key or not. In step B8, if the keys are identical in step B7, service for the user-selected channel is given, and the step returns to step A7. If the keys are not in step B7, in step B9, a password error message is output, broadcast for the channel selected prior to change is transmitted, and step A7 is performed.

Figure 5:
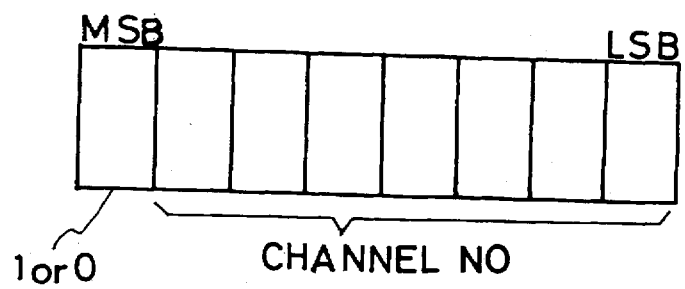
FIG. 5 is a diagram of data format stored in a key buffer.

Referring to FIG. 5, when the MSB is "1," it indicates that the channel used is password-registered. If the MSB is "0," it indicates the channel is a general one in which a password is not registered. In the remaining bits, a television channel number used prior to power off is stored. All the bit values are changed whenever the user changes the channel.

Referring to FIGS. 6A–6I, on-screen display (OSD) is roughly divided into two portions. The first portion (500) displays the situation of channels into which a user-registered password is input. For instance, in FIG. 6A, in the case when channels 2 and 4 are password-registered, they look different from no-password channels in color. The second portion 600 is a user-input screen to inquire whether a new password is to be input or not. Turning back to FIG. 3, keys + and − of key pad 11 are keys, on the password registration screen, to switch password change mode and new key input mode according to user's conditions. They are used to change channels back and forth.

Figure 6A:
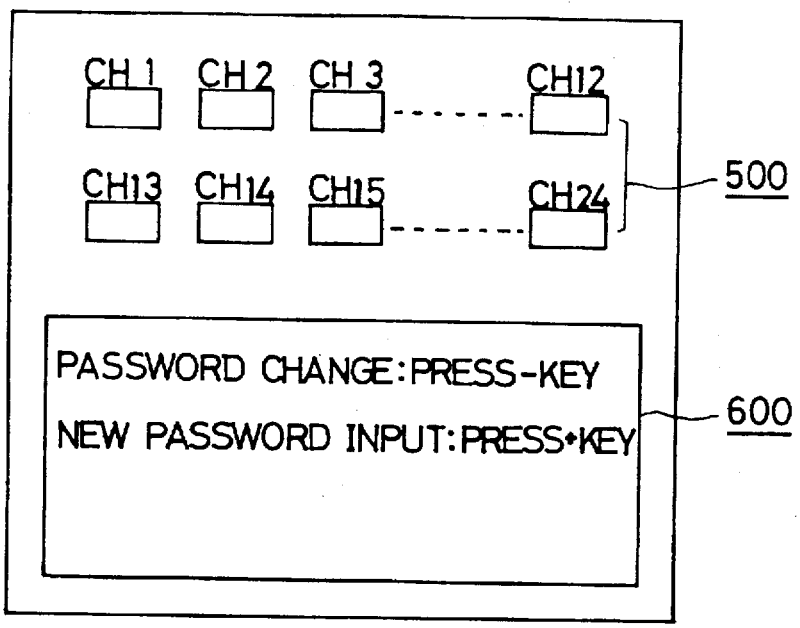
FIGS. 6A–6I are types of on-screen display.
Figure 6B:
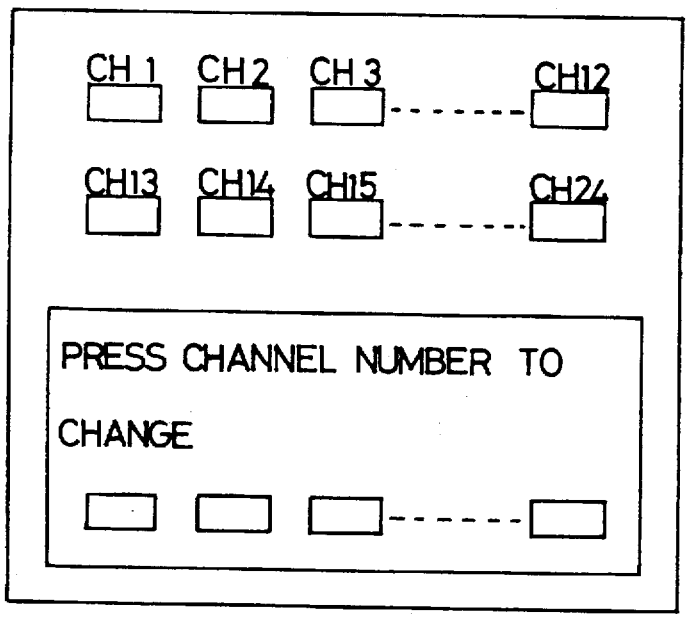
Figure 6C:
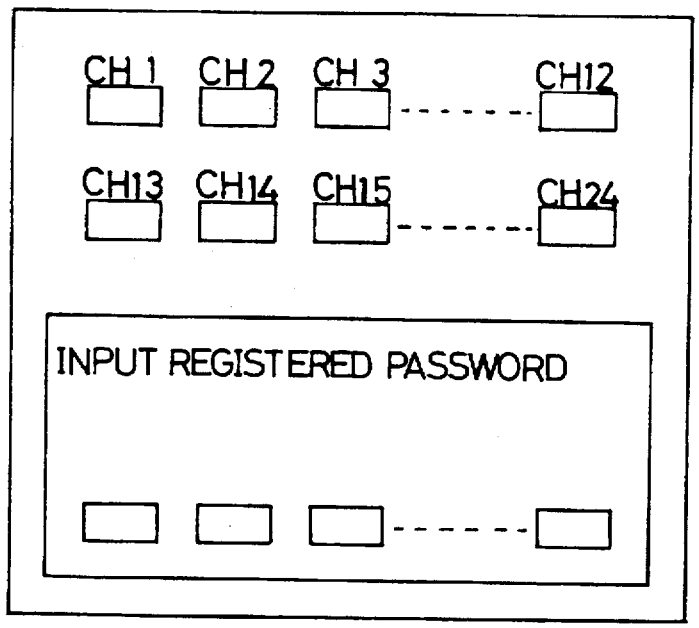
Figure 6D:
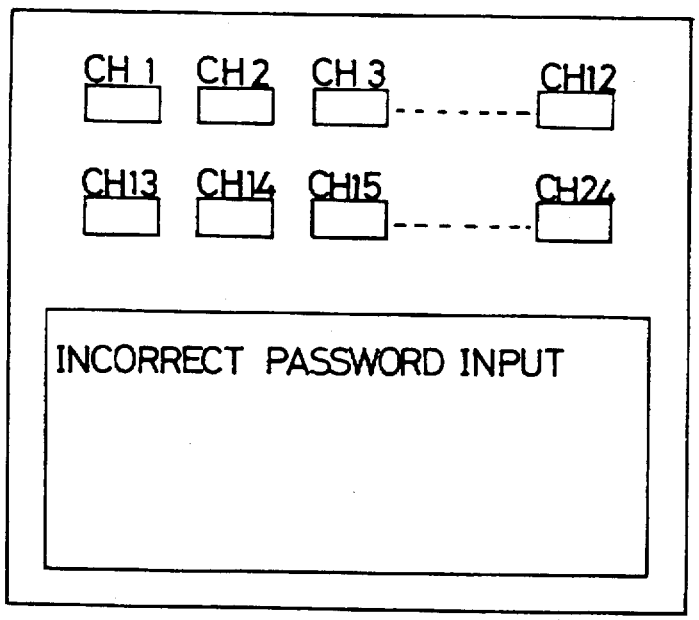
Figure 6E:
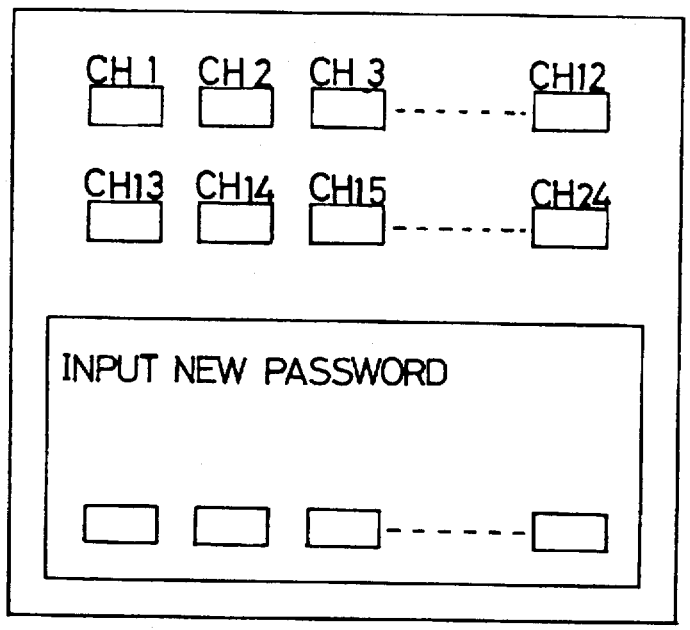
Figure 6F:
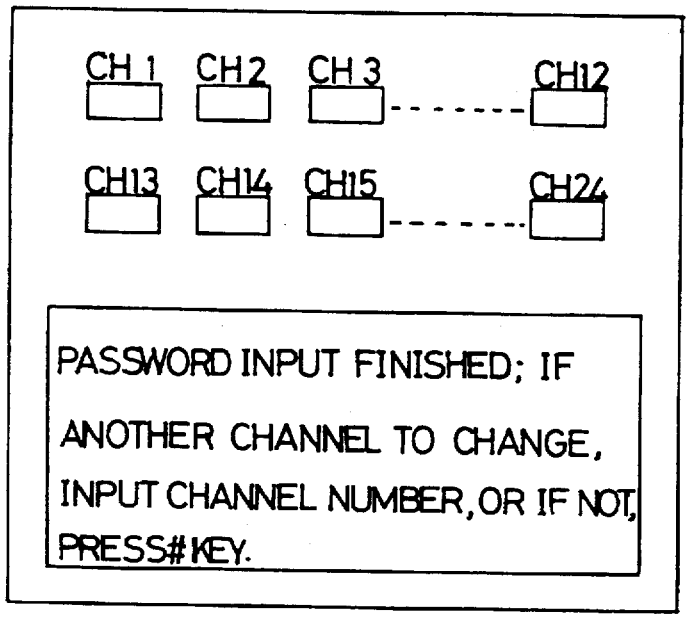

In order to change the password as in step A11 of FIG. 4B, key − is pressed so that screen of FIG. 6B is displayed. Here, the number of a channel whose password the user wants to change is input. If the user wants to register a password onto channel 1, keys "01" are pressed to display the screen of FIG. 6C. Then, the user is ordered to input the already registered (old) password for the channel. When the user-input password is identical to the old password, the screen of FIG. 6E is displayed, and the user-input password is registered in the subscriber's in-house apparatus. Thereafter, the changed password channel is displayed as in FIG. 6F. In the above process, if the old password is different from the currently registered password, a password error message is displayed as in FIG. 6D.

If the user presses key + in FIG. 6A, this means a mode in which a new password is input. This case is to register a new password when the user forgets his password. For this, a request to erase the password of the subscriber's in-house apparatus should be first sent to the head end or central office.

For signaling between cable television signal transmitter and subscriber's in-house apparatus, a password erase signal PSW_DEL is received by the subscriber's in-house apparatus. The subscriber's in-house apparatus erases all the internally registered passwords, transmits password erase recognition response signal PSW_DEL_ACK to cable television signal transmitter 15, and stores the transmission state of the password erase recognition response signal to the system buffer.

Figure 6G:
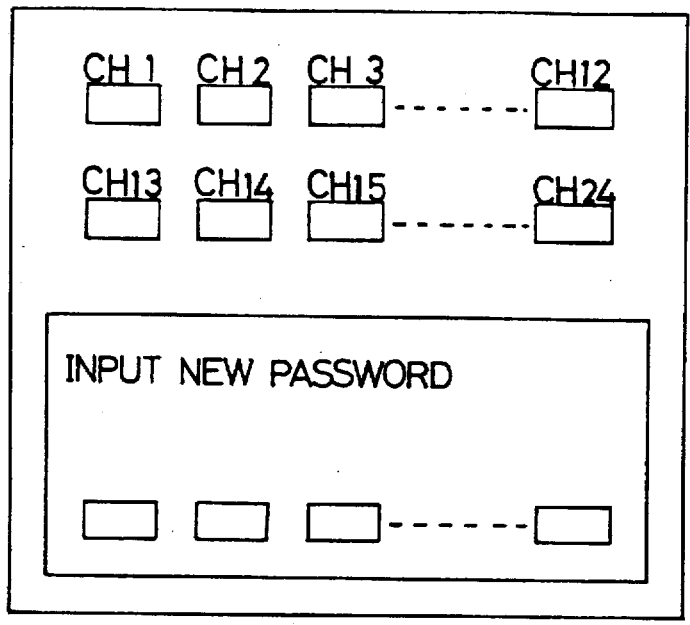

In FIG. 4B, if the mode is changed to a mode to input a new password by the user, the central processing unit of the subscriber's in-house apparatus ascertains whether the transmission state of the password erase recognition response signal is stored in the system buffer. When the password erase recognition response signal is transmitted, the screen of FIG. 6G is displayed, a new password is registered. If the transmission state of the password erase recognition response signal is not stored, this indicates that the password is not erased. In this case, the screen of FIG. 6I is displayed, and the step returns to the previous cable television service state. This mode is to wait for a key to be input by the user.

Figure 6H:
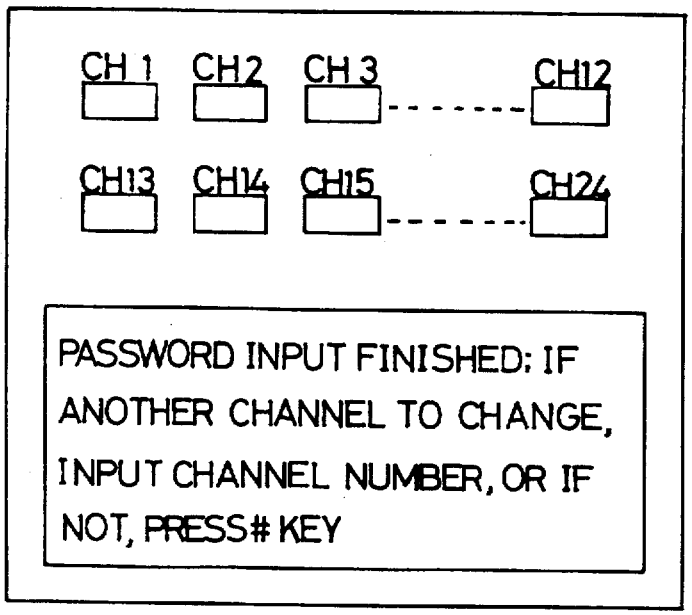
Figure 6I:
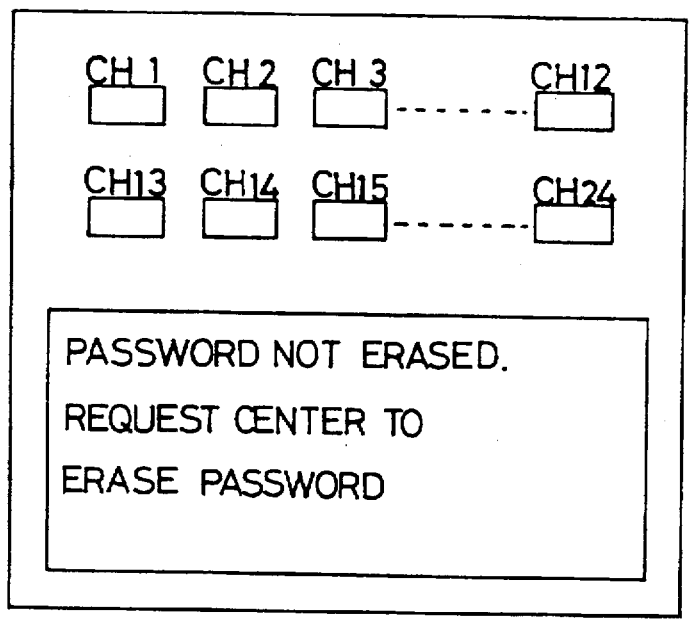

In the above process, if the registration of password is to be continued, a channel number is pressed in the screen of FIG. 6H, to repeat the registration operation. If not, key # is pressed to stop the operation.

Cable television broadcasting will provide a variety of programs. Among them must be programs not suitable for people like children, or limited in viewing. In this case, a password function will be required for a specific channel. The present invention is devised for this case. In the present invention, the on-screen display function is used simply and effectively to change or register passwords.

What is claimed is:

1. A password restriction apparatus for cable television channels using a key input controller, comprising:

a cable television transmitting/receiving portion in a subscriber's in-house cable TV apparatus for at least one of receiving and transmitting a cable television signal;

a downward receiving signal controller for receiving a downward receiving signal output from said cable television transmitting/receiving portion and transmitting digital signals to control the generation of video and audio signals;

a television/audio decoder for decoding said digital signals to generate video and audio signals;

a central processing unit for processing passwords for enabling a user to at least select one of changing a password channel and processing a new password from the cable television signal transmitting/receiving portion;

an upward transmitting signal controller for multiplexing a user-controlled signal and maintenance signal output from said central processing unit and transmitting the multiplexed signals to said cable television transmitting/receiving portion;

an on-screen display controller for generating a user-controlled screen on a user television screen and transmitting the user-controlled generated screen to the television/audio decoder;

a user-operated key pad for generating password channel selection data and password channel restriction data in the form of switching signal inputs;

a key pad controller for inputting the switching signal inputs to said central processing unit and processing a scanning signal from said central processing unit;

a remote controller receiver for receiving an infrared signal from a remote controller and transmitting the infrared signal to said central processing unit, said infrared signal including signals for generating password channel selection and password channel restriction data;

a memory for storing system parameters required for operating said central processing unit;

said central processing unit comprises means for sending screen data relating to at least one of the password channel selection data and password channel restriction data from the memory to the on-screen display controller;

the central processing unit controlling the downward receiving controller and the upward transmitting signal controller to receive a delete signal PSW-DEL from said transmitting/receiving portion through said downward receiving controller in response to the password channel restriction data;

said central processing unit sending an acknowledgment signal PSW-DEL-ACK to the transmitting/receiving portion through said upward transmitting signal controller; and said central processing unit storing the response from the transmitting/receiving portion with respect to the acknowledgment signal.

2. The password restriction apparatus as claimed in claim 1, wherein said downward signal receiving controller separately compresses digital signals for signal decoding and control signals for password channels and said cable transmitting/receiving portion includes means for multiplexing both the compressed digital signals and the delete control signals from the cable television transmitting/receiving portion, and transmits the multiplexed signals inclusive of the acknowledgment signal from the upward transmitting signal controller to the cable television transmitting/receiving portion.

3. The password restriction apparatus according to claim 1, wherein said memory comprises a first region for temporarily storing a system parameter for operation of the cable television transmitting/receiving portion of the subscriber's in-house apparatus, a second region for storing user parameters inclusive of a parameter generated after sending an acknowledgment signal such as a user-controlled signal and a parameter controlled by the transmitting/receiving portion, a third region for storing screen information for the on-screen display controller, a fourth region for storing key data from the key pad on the remote controller, and a fifth region for storing restricted channels and the corresponding password thereof.

4. The password restriction apparatus according to claim 1, further comprising a battery back-up portion for protecting the contents of said memory in case of main power failure.

* * * * *